(12) United States Patent
Niemi et al.

(10) Patent No.: US 9,503,997 B2
(45) Date of Patent: Nov. 22, 2016

(54) METHOD AND APPARATUS FOR REGISTERING WITH A PUBLIC LAND MOBILE NETWORK

(71) Applicant: Broadcom Corporation, Irvine, CA (US)

(72) Inventors: Marko Tapani Niemi, Oulu (FI); Hannu Petri Hietalahti, Kiviniemi (FI)

(73) Assignee: BROADCOM CORPORATION, Irvine, CA (US)

( * ) Notice: Subject to any disclaimer, the term of this patent is extended or adjusted under 35 U.S.C. 154(b) by 336 days.

(21) Appl. No.: 14/039,464

(22) Filed: Sep. 27, 2013

(65) Prior Publication Data

US 2015/0094062 A1    Apr. 2, 2015

(51) Int. Cl.
| | | |
|---|---|---|
| *H04W 60/00* | (2009.01) | |
| *H04W 88/06* | (2009.01) | |
| *H04W 48/16* | (2009.01) | |
| *H04W 4/08* | (2009.01) | |

(52) U.S. Cl.
CPC ............. *H04W 60/00* (2013.01); *H04W 48/16* (2013.01); *H04W 4/08* (2013.01)

(58) Field of Classification Search
CPC ... H04W 60/00; H04W 48/16; H04W 88/06; H04W 4/08
USPC .......................................... 455/435.2, 552.1
See application file for complete search history.

(56) References Cited

U.S. PATENT DOCUMENTS

| | | | | |
|---|---|---|---|---|
| 2004/0192306 | A1* | 9/2004 | Elkarat | ............ H04W 8/06 455/435.2 |
| 2005/0064889 | A1* | 3/2005 | Haumont | ........... H04W 48/17 455/514 |
| 2005/0075129 | A1* | 4/2005 | Kuchibhotla | ......... H04W 48/18 455/552.1 |
| 2010/0113020 | A1* | 5/2010 | Subramanian | ........ H04W 48/18 455/435.2 |
| 2011/0080849 | A1* | 4/2011 | Choi | ................... H04W 48/16 370/254 |
| 2011/0177810 | A1* | 7/2011 | Kim | .................... H04W 48/18 455/432.1 |

OTHER PUBLICATIONS

3GPP TS 23.122 v12.2.0 (Sep. 2013); 3GPP; Non-Access-Stratum (NAS) Functions Related to Mobile Station (MS) in Idle Mode (Release 12); (45 pages).

* cited by examiner

*Primary Examiner* — William Nealon
(74) *Attorney, Agent, or Firm* — Oblon, McClelland, Maier & Neustadt, L.L.P.

(57) ABSTRACT

A wireless device is in a closed subscriber group CSG which was selected manually by the user. The wireless device receives an input from a user to initiate automatic PLMN selection in order to attempt to register with a PLMN. The wireless device uses a registered PLMN during the automatic PLMN selection initiated by the user.

11 Claims, 4 Drawing Sheets

100. A wireless device, in a closed subscriber group CSG which was selected manually, receives an input from a user to initiate automatic PLMN selection in order to attempt to register with a PLMN 110. The wireless device selects the currently registered PLMN of the wireless device as the highest priority PLMN for the automatic PLMN selection 120. The wireless device restores the stored duplicate of registered PLMN as a registered PLMN of the wireless device and uses that registered PLMN as the highest priority PLMN for the automatic PLMN selection 130. The wireless device selects one of (i) the currently registered PLMN of the wireless device and (ii) a home or equivalent home PLMN of the wireless device for the automatic PLMN selection 140. The wireless device records whether a previous PLMN selection mode was automatic or manual; and in the case that the previous PLMN selection mode was manual, the wireless device uses a previously stored registered PLMN as the highest priority PLMN for the automatic PLMN selection

Fig. 3

200. A wireless device, in a closed subscriber group CSG, stores a duplicate value of a registered PLMN and stored PLMN selection mode.

210. The wireless device invalidates/deletes/nulls the stored duplicate value of registered PLMN and stored PLMN selection mode when the wireless device has further entered into either a manual or an automatic PLMN selection mode

Fig. 4

METHOD AND APPARATUS FOR REGISTERING WITH A PUBLIC LAND MOBILE NETWORK

TECHNICAL FIELD

The present invention relates to a method and apparatus for registering with a public land mobile network.

BACKGROUND

The following abbreviations which may be found in the specification and/or the drawing figures are defined as follows:
- 3GPP 3rd Generation Partnership Project
- CDMA Code Division Multiple Access
- CSG Closed Subscriber Group
- eNB evolved Node B
- EHPLMN equivalent HPLMN
- E-UTRAN Evolved Universal Terrestrial Radio Access Network
- GERAN GSM EDGE Radio Access Network
- GSM Global Systems for Mobile communications
- GPRS General Packet Radio Service
- HPLMN home PLMN
- LTE Long Term Evolution
- MCC Mobile Country Code
- MNC Mobile Network Code
- MS mobile station
- PLMN public land mobile network
- RAT radio access technology
- RPLMN registered PLMN
- UMTS Universal Mobile Telecommunications System
- UTRAN Universal Terrestrial Radio Access Network Use has been made of small cell wireless access technology, in which a small cell is serviced by a small, low-power cellular base station. The term "femtocell" is often used for such small cells, though other terminology is also used. These are typically designed for use in a home, restaurant or small business or the like, and may have a range of the order of 10 m to 100 m or so (though other ranges are possible). Such small cells may provide service only for a limited number of specific users or subscribers, and in such a case may be referred to as a Closed Subscriber Group or CSG cell. Any given CSG may include a group of cells or a single cell. CSGs may allow traffic access for non-subscribers for emergency calls or routine, non-emergency access. The small cell (i.e. its base station) is typically ultimately connected to a core network. That core network may be a core network of a public land mobile network (PLMN) which comprises the core network and a radio access network that provides wireless access to the core network. The radio access network of the PLMN may be a "large" or "macro" cell, using for example a high power cellular base station or the like.

However, there are a number of problems associated with such small cells, particularly CSG cells, especially when a particular wireless device or "user equipment" that was using a CSG cell attempts to start using a macro cell.

SUMMARY

In a first exemplary embodiment of the invention, there is a method of a wireless device attempting to register with a public land mobile network PLMN, the method comprising: the wireless device being in a closed subscriber group CSG which was selected manually; the wireless device receiving an input from a user to initiate automatic PLMN selection in order to attempt to register with a PLMN; and the wireless device using a registered PLMN during the automatic PLMN selection initiated by the user.

In a second exemplary embodiment of the invention, there is a method of a wireless device attempting to register with a public land mobile network PLMN, the method comprising: the wireless device being in a closed subscriber group CSG; the wireless device storing a duplicate value of a registered PLMN and stored PLMN selection mode; the wireless device invalidating/deleting/nulling the stored duplicate value of registered PLMN and stored PLMN selection mode when the wireless device being in a closed subscriber group CSG has further entered into either a manual or an automatic PLMN selection mode.

In a third exemplary embodiment of the invention, there is apparatus for a wireless device, the apparatus comprising: at least one processor; and at least one memory including computer program code; the at least one memory and the computer program code being configured to, with the at least one processor, cause the wireless device at least to attempt to register with a public land mobile network PLMN by: the wireless device, being in a closed subscriber group CSG which was selected manually, receiving an input from a user to initiate automatic PLMN selection in order to attempt to register with a PLMN; and the wireless device using a registered PLMN during the automatic PLMN selection initiated by the user.

There may also be provided a computer program comprising instructions such that when the computer program is executed on a processing system of a wireless device, the wireless device is arranged to operate as described above.

There may be provided a non-transitory computer-readable storage medium storing a computer program as described above.

Further features and advantages of the invention will become apparent from the following description of preferred embodiments of the invention, given by way of example only, which is made with reference to the accompanying drawings.

BRIEF DESCRIPTION OF THE DRAWINGS

FIG. 3 shows schematically an example of a method of operating a user equipment; and FIG. 4 shows schematically another example of a method of operating a user equipment.

DETAILED DESCRIPTION

Figure 1:
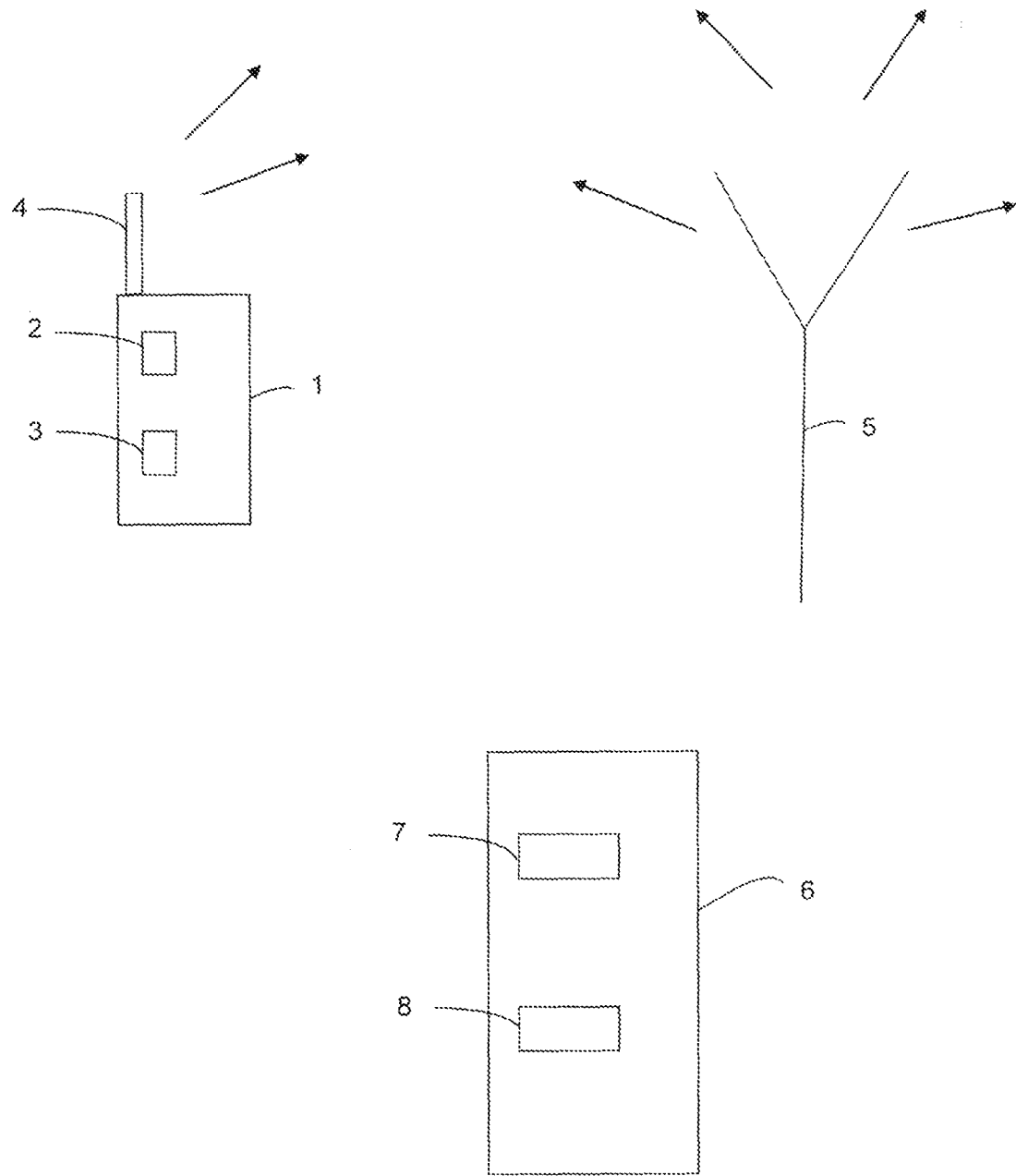
FIG. 1 shows schematically examples of a user equipment or wireless device and network equipment.

In broad terms, in some exemplary embodiments of the present disclosure, a wireless device or UE, when in a closed subscriber group CSG which was selected manually, is arranged to use a registered PLMN during automatic PLMN selection that has been initiated by the user. In general, in some exemplary embodiments in for example roaming cases, this speeds up the selection of the PLMN. Also, in some exemplary embodiments, if the previous PLMN selection mode was manual, this also represents the user's latest manual choice in the first automatic PLMN selection.

The method of the first exemplary embodiment may comprise the wireless device selecting the currently registered PLMN of the wireless device as the highest priority PLMN for the automatic PLMN selection.

The method of the first exemplary embodiment may comprise the wireless device selecting a home or equivalent home PLMN of the wireless device as the next highest priority for the automatic PLMN selection.

The method of the first exemplary embodiment may comprise the wireless device restoring the stored duplicate of registered PLMN as a registered PLMN of the wireless device and using that registered PLMN as the highest priority PLMN for the automatic PLMN selection.

The method of the first exemplary embodiment may comprise the wireless device selecting one of (i) the currently registered PLMN of the wireless device and (ii) a home or equivalent home PLMN of the wireless device for the automatic PLMN selection. In an exemplary embodiment, one of (i) the currently registered PLMN and (ii) the home or equivalent PLMN is selected as the highest priority PLMN for the automatic PLMN selection. In an exemplary embodiment, the other of (i) the currently registered PLMN and (ii) the home or equivalent PLMN is selected as the next highest priority PLMN for the automatic PLMN selection. In another exemplary embodiment, the currently registered PLMN and the home or equivalent PLMN are selected to have the same priority for the automatic PLMN selection.

The method of the first exemplary embodiment may comprise the wireless device recording whether a previous PLMN selection mode was automatic or manual; and in the case that the previous PLMN selection mode was manual, the wireless device using a previously stored registered PLMN as the highest priority PLMN for the automatic PLMN selection.

The method of the first exemplary embodiment may comprise the wireless device using a home or equivalent home PLMN of the wireless device for the automatic PLMN selection in the case that the previous PLMN selection mode was automatic.

"Wireless devices" include in general any device capable of connecting wirelessly to a network, and includes in particular mobile devices including mobile or cell phones (including so-called "smart phones"), personal digital assistants, pagers, tablet and laptop computers, wearable communication devices, content-consumption or generation devices (for music and/or video for example), data cards, USB dongles, devices for vehicles (for example connected cars) with wireless communication etc., as well as fixed or more static devices, such as personal computers, game consoles and other generally static entertainment devices, and various other domestic and non-domestic machines and devices, including for example consumer electronics and public safety devices, etc. The term "user equipment" or UE is often used to refer to wireless devices in general, and particularly mobile wireless devices.

Reference will sometimes be made in this specification to "network", "network control apparatus" and "base station". In this respect, it will be understood that the "network control apparatus" is the overall apparatus that provides for general management and control of the network and connected devices. Such apparatus may in practice be constituted by several discrete pieces of equipment. As a particular example in the context of UMTS (Universal Mobile Telecommunications System), the network control apparatus may be constituted by for example a so-called Radio Network Controller operating in conjunction with one or more Node Bs (which, in many respects, can be regarded as "base stations"). As another example, LTE (Long Term Evolution) makes use of a so-called evolved Node B (eNB) where the radio frequency transceiver and resource management/control functions are combined into a single entity. The term "base station" is used in this specification to include a "traditional" base station, a Node B, an evolved Node B (eNB), or any other access point to a network, unless the context requires otherwise. Moreover for convenience and by convention, the terms "network", "network control apparatus" and "base station" will often be used interchangeably, depending on the context.

A basic system architecture of a communication network where some examples of embodiments of the invention are applicable may comprise a commonly known architecture of one or more communication networks comprising a wired or wireless access network subsystem and a core network. Such communication networks may include for example a Universal Mobile Telecommunications System (UMTS) network, a Long Term Evolution (LTE) network, an LTE-Advanced (LTE-A) network, a Global Systems for Mobile communications (GSM) network, a Code Division Multiple Access (CDMA) network, e.g., a Wideband CDMA (WCDMA) network, a CDMA2000 network or the like, and a General Packet Radio Service (GPRS) network. Examples of suitable wireless (or "radio") access networks include a GSM EDGE Radio Access Network (GERAN), a Universal Terrestrial Radio Access Network (UTRAN), an Evolved Universal Terrestrial Radio Access Network (E-UTRAN), etc.

FIG. 1 shows schematically a user equipment or wireless device, in this case in the form of a mobile phone/smartphone 1. The user equipment 1 contains the necessary radio module 2, processor(s) and memory/memories 3, antenna 4, etc. to enable wireless communication with the network. The user equipment 1 in use is in communication with a radio mast 5. As a particular example in the context of UMTS (Universal Mobile Telecommunications System), there may be a network control apparatus 6 (which may be constituted by for example a so-called Radio Network Controller) operating in conjunction with one or more Node Bs (which, in many respects, can be regarded as "base stations"). As another example, LTE (Long Term Evolution) makes use of a so-called evolved Node B (eNB) where the RF transceiver and resource management/control functions are combined into a single entity. In this case, the network control apparatus 6 may also be a low power base station of a small cell or femtocell, including for a Closed Subscriber Group or CSG. As mentioned, the term "base station" is used in this specification to include a "traditional" base station, a Node B, an evolved Node B (eNB), or any other access point to a network, unless the context requires otherwise. The network control apparatus 6 (of whatever type) may have its own processor(s) 7 and memory/memories 8, etc.

Figure 2:
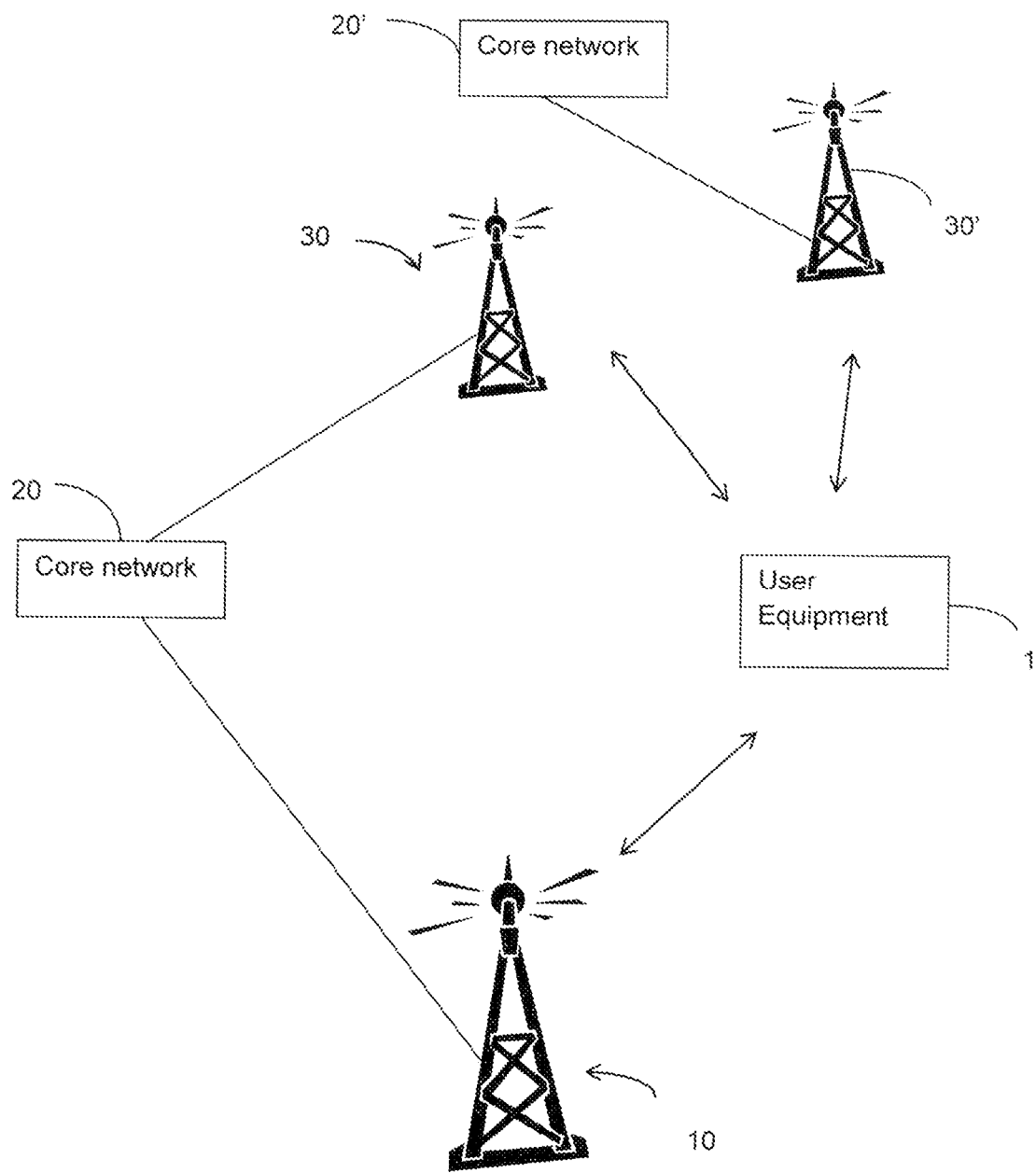
FIG. 2 shows schematically an example of a user equipment which can communicate wirelessly with a macro cell and a small cell, which communicate with a core network.

FIG. 2 shows schematically a user equipment or UE 1 which can communicate wirelessly with a base station of a macro cell 10 which communicates with a core network 20. The UE 1 can also communicate wirelessly with a base station of a small cell 30, such as a femtocell 30, which also communicates with the core network 20. The UE 1 typically communicates only with the macro cell 10 or with the small cell 30 at any particular time. The small cell 30 may be a CSG cell 30. The CSG cell 30 has a CSG Identity (CSG ID) and an identity (PLMN ID) of a Public Land Mobile Network (PLMN) associated therewith. The CSG ID and the PLMN ID may be communicated to the UE 1 by, for example, the core network 20 or a serving cell, such as the macro cell 10, in a neighborhood advertisement System Information message, or by the CSG cell 30. In practice there may be many CSG cells 30, 30' from different PLMNs which are accessible to the UE 1. Likewise, there may be many UEs 1. The macro cell 10 and the small cell or CSG cell 30 may each provide for voice and/or data communication for the UE 1. Some CSG cells 30 that are discovered by the UE 1 can be connected to the registered macro cell PLMN (RPLMN) of the UE 1 using the same core network 20 (as shown schematically in FIG. 2), and other CSG cells 30' can be part of another PLMN that uses a different core network 20'.

In general, the CSG cell 30 can be selected by the UE 1 either by automatic CSG cell selection mode or by manual CSG selection mode. By manual CSG selection, the user can select a CSG cell that is not listed in the user's allowed ("white") CSG list or an operator CSG list provided by the home operator. In any event, there are occasions when the UE 1 loses connection with or is unable to register with a CSG cell 30. For example, registration on the CSG cell 30 may fail in the first place for some reason, or the UE 1 is switched off and then switched on again, or the UE 1 has moved out of coverage of the CSG cell 30. There are various proposals for handling this. It has been appreciated that these do not cover all situations when the UE needs to change from manual CSG selection to normal PLMN selection among PLMNs that can be discovered via macro cells. An example of this is when the user, still in the coverage of a manually selected CSG cell, wants to leave the CSG service in order to move to normal PLMN selection mode, including PLMNs that are available via macro cells. Documentation of such cases is practically non-existent, and some design choices are not particularly efficient, and can for example cause delays for the UE 1 in connecting again and cause undesirable battery drain for the UE 1.

As a particular example, the Technical Specification 3GPP TS 23.122 of the 3rd Generation Partnership Project requires that if the user manually selects a CSG cell in a PLMN that is different from the RPLMN (the current registered PLMN), then the UE 1 must store duplicates of the PLMN selection mode (i.e. manual or automatic) and the last registered PLMN (RPLMN) prior to entering CSG cell selection. (The data for the last RPLMN may be the MCC+MNC (Mobile Country Code and Mobile Network Code) of the last registered PLMN.) This information is stored in order to intelligently restore the PLMN selection situation in the next PLMN selection in macro cells outside of the CSG. In particular, the relevant portion of sub clause 4.4.3.1.3.3 of 3GPP TS 23.122 is:
4.4.3.1.3.3 Manual CSG Selection in a PLMN Different from the RPLMN iv) If the registration fails or the MS is no longer in the coverage of the selected CSG, then the MS shall return to the stored duplicate PLMN selection mode and use the stored duplicate value of RPLMN for further action; and v) If the MS is switched off while on the selected CSG and switched on again, the MS should return to the stored duplicate PLMN selection mode, unless the MS provides the optional feature of user preferred PLMN selection operating mode at switch on. Additionally, the MS shall use the stored duplicate value of RPLMN for further action.

(Here the term "MS" or "mobile station" is used equivalently for user equipment or UE.)

The UE actions at switch-on or recovery from lack of coverage are specified in 3GPP TS 23.122 sub clause 4.4.3.1 as follows:
4.4.3.1 at Switch-on or Recovery from Lack of Coverage At switch on, or following recovery from lack of coverage, the MS selects the registered PLMN or equivalent PLMN (if it is available) using all access technologies that the MS is capable of and if necessary (in the case of recovery from lack of coverage, see subclause 4.5.2) attempts to perform a Location Registration.

EXCEPTION: As an alternative option to this, if the MS is in automatic network selection mode and it finds coverage of an EHPLMN, the MS may register to that EHPLMN and not return to the registered PLMN or equivalent PLMN. If the EHPLMN list is not present or is empty, and the HPLMN is available, the MS may register on the HPLMN and not return to the registered PLMN or equivalent PLMN. The operator shall be able to control by SIM configuration whether an MS that supports this option is permitted to perform this alternative behaviour.

As can be seen from the above, only at switch-on or when returning from lack of coverage, the UE normally selects the RPLMN (i.e. the current registered PLMN), but also an exception has been specified, to optionally select the HPLMN (i.e. the home PLMN of the user of the UE, with which the user usually has some contract for services) or EHPLMN (equivalent HPLMN). As mentioned, this requirement to select the current registered PLMN and the optional exception to it only apply at switch on and when returning from lack of coverage.

Further actions in automatic PLMN selection mode are specified in the following sub clause 4.4.3.1.1 of 3GPP TS 23.122 as follows:
4.4.3.1.1 Automatic Network Selection Mode Procedure
The MS selects and attempts registration on other PLMN/access technology combinations, if available and allowable, in the following order:

i) either the HPLMN (if the EHPLMN list is not present or is empty) or the highest priority EHPLMN that is available (if the EHPLMN list is present);

ii) each PLMN/access technology combination in the "User Controlled PLMN Selector with Access Technology" data file in the SIM (in priority order);

iii) each PLMN/access technology combination in the "Operator Controlled PLMN Selector with Access Technology" data file in the SIM (in priority order);

iv) other PLMN/access technology combinations with received high quality signal in random order;

v) other PLMN/access technology combinations in order of decreasing signal quality.

As can be seen, in the case that automatic PLMN selection is not associated with either switch-on or returning from lack of coverage, then, in accordance with this 3GPP specification, the UE must always attempt to select the HPLMN as the highest priority PLMN. Accordingly, if for example the user sets the UE to automatic PLMN selection mode after the CSG cell has been selected manually, the subsequent PLMN selection is done in automatic PLMN selection mode (ref 3GPP TS 23.122, clause 4.4.3.1.1), i.e. the new user setting of automatic mode overrides the previously stored old PLMN selection mode. If the UE is in the home country, then the HPLMN would be the obvious choice. If the UE is not roaming, the HPLMN must also be the current RPLMN, so again in this case there is no particular issue. However, it has been appreciated that if the UE is roaming, then the lack of knowledge or use of information about the old, stored RPLMN has a negative impact on finding service on a normal cell when the next PLMN selection is performed. For example, this can slow down the finding of a suitable macro cell (i.e. a non-CSG cell here) for the UE and can undesirably consume battery power owing to the signaling that is required of the UE.

In accordance with exemplary embodiments of the present disclosure, the wireless device or UE, when in a closed subscriber group CSG which was selected manually, is arranged to use a registered PLMN during automatic PLMN selection that has been initiated by the user. In accordance with one exemplary approach of the present disclosure, the RPLMN may be considered to be the highest priority PLMN in normal automatic PLMN selection when, based on user request, the wireless device enters automatic PLMN selection mode after manual CSG selection (and for example not only at switch-on or returning from lack of coverage). In accordance with another exemplary approach of the present disclosure, a decision is made in the UE to determine the priority level of the RPLMN and the HPLMN when entering automatic PLMN selection mode due to the user having requested automatic PLMN selection after manual CSG selection. For the user, this brings about an improved user experience in that the user's choice, which was stored previously, is restored after resuming macro cell mode after CSG use. This improvement is the result of avoiding an unnecessary full PLMN search after return from a manual CSG state, which means more optimal power consumption for the UE and also that the original macro cell network (i.e. the non-CSG network) can be found more quickly. It may be noted that, since CSG cells provide only very small and localized coverage, it is likely in many practical cases that the previous RPLMN macro cell would still be available after the UE leaves CSG mode. Accordingly, the previous RPLMN cell can be found very quickly, for example using the old neighbor list which is held by the UE. If the UE has to consider HPLMN as the highest priority PLMN as specified in 3GPP TS 23.122, clause 4.4.3.1.1, then the UE must scan all its supported RATs and frequency bands to ensure that HPLMN is not available until it is allowed to select any of the available VPLMN candidates. On this, it may be noted that, currently, a full scan in a modern multi-mode mobile phone can take up to a few minutes (due principally to system restrictions, rather than UE performance constraints say), whereas a so-called short list scan using an old neighbor list of the previous RPLMN typically takes only a few seconds.

In more detail, as mentioned above, it is already known that the UE can move from manual CSG selection to automatic PLMN selection due to many reasons, such as losing coverage of the CSG cell, the UE being switched off, or the user initiating automatic PLMN selection. In the case of a 3GPP system, whether for example a UMTS, a LTE/LTE-A or a GERAN system say, the existing procedure for the UE when automatic PLMN selection has been initiated is specified in 3GPP TS 23.122 clause 4.4.3.1.1. However, as discussed above, that procedure completely omits consideration of the RPLMN and in particular omits consideration of the stored old RPLMN as a high priority PLMN in the selection.

In a first preferred approach described herein, the UE is arranged to consider the RPLMN as a prioritized PLMN when automatic PLMN selection has been selected or initiated by the user when the UE is registered in the manually selected CSG. Three specific examples of how this can be achieved are as follows. It may be noted that in the case of a 3GPP system in particular, this decision to consider the RPLMN as a prioritized PLMN in automatic PLMN selection which has been initiated by the user may be in addition to the current specification of TS 23.122 sub clause 4.4.3.1, which only currently applies at switch-on of the UE or recovery following lack of coverage for the UE, as discussed in more detail above.

In one example of this first preferred approach, the UE makes the currently registered PLMN (RPLMN), if known, the highest priority PLMN for automatic PLMN selection. In the case of a 3GPP system in particular, and following the current specification in 3GPP TS 23.122 sub clause 4.4.3.1.1 "Automatic Network Selection Mode Procedure" discussed above, the HPLMN/EHPLMN can be made the second highest priority choice, followed by other lower priority PLMNs as set out in sub clause 4.4.3.1.1. This has an advantage of being straightforward to implement. HPLMN is of course the most desirable choice, but it does not suffer any disadvantage due to this arrangement. HPLMN is typically not available in a foreign country, so the latest RPLMN is most likely a reasonable choice that can be found quickly. In the HPLMN country, the RPLMN is in most cases the same as the HPLMN.

In a second example of this first preferred approach, the UE is arranged to automatically select either the current RPLMN or the HPLMN, if either of the two is available. (To emphasize, this is different from the current specification in 3GPP TS 23.122 sub clause 4.4.3.1.1, as that has the HPLMN/EHPLMN as the highest priority and disregards entirely the RPLMN.) This second example may be implemented using a prioritized pair of target PLMNs, with the RPLMN as the primary having a higher priority and the HPLMN as the secondary having a lower priority or vice versa. These are not mutually exclusive, as HPLMN priority would work optimally in the HPLMN country, whereas RPLMN priority is ideal when the UE is roaming outside of the HPLMN country and therefore not likely to find the HPLMN anyway. A simple rule that puts both RPLMN and HPLMN/EHPLMN together on the top priority level would also achieve the same result in most cases, since the HPLMN/EHPLMN is very likely to be found in the HPLMN country and the previous RPLMN would most likely be selected in the absence of any HPLMN/EHPLMN such as may occur outside the HPLMN country.

In a third example of this first preferred approach, the UE restores the stored duplicate of the registered PLMN (which it has stored previously) as the registered PLMN of the UE. The UE then uses that registered PLMN as the highest priority PLMN for the automatic PLMN selection. This is particularly useful in the case that the user has manually selected a CSG cell in a PLMN that is different from the RPLMN (the current registered PLMN). In such a case, the UE 1 will have stored duplicates of the PLMN selection mode (i.e. manual or automatic) and the last registered PLMN (RPLMN) prior to entering CSG cell selection.

In a second approach described herein, the UE is arranged to determine whether or not to use the old, stored RPLMN information in the case of automatic PLMN selection, for example when automatic PLMN selection has been selected or initiated by the user when the UE is registered in the manually selected CSG.

In this second alternative approach, the stored old PLMN selection mode may be used as a criterion in the decision to choose which PLMN is considered as the highest priority PLMN in automatic PLMN selection when leaving CSG mode. For example, the UE may analyze the contents of the stored previous PLMN selection mode and, depending on whether it was set to manual PLMN selection or automatic PLMN selection, prioritize between the stored previous RPLMN or HPLMN/EHPLMN. As a particular example of this, the UE may be configured to operate as follows:

(i) If the previous, stored PLMN selection mode was "automatic PLMN selection", then the user has not indicated any PLMN preference in the choice of PLMN, and the UE will have automatically picked the highest priority choice. In this case, when the UE is on the home PLMN, the automatic PLMN selection with or without considering the stored RPLMN is likely to lead to the same RPLMN. However, in the roaming case when HPLMN is not available, the use of stored RPLMN as prioritized PLMN candidate can speed up the process of finding that RPLMN.

(ii) On the other hand, if the previous, stored PLMN selection mode was "manual PLMN selection", this indicates that the user had overridden the automatic PLMN selection logic and determined, based on his or her own decision, that some other PLMN is the most suitable for his/her needs. In this situation, it would improve the user experience if the UE took the old, stored RPLMN into account for the subsequent automatic PLMN selection. Accordingly, in the case that the previous PLMN selection mode was "manual PLMN selection", the automatic PLMN selection mode may be resumed, but with the stored old RPLMN which was selected by the user manually taking the highest priority.

A particular benefit of this second preferred approach is quick finding of service for the UE, especially when the UE is roaming outside of the HPLMN. Using the automatic PLMN selection procedure currently specified in 3GPP TS 23.122 sub clause 4.4.3.1.1 forces the UE to try the HPLMN first. However, when roaming abroad, the HPLMN will (typically) not be available. This means that the UE would need to carry out a full scan of all radio access technologies (RATs) and bands to "prove" that the HPLMN is not available before it is allowed to select among lower priority PLMNs as currently specified in 3GPP TS 23.122 sub clause 4.4.3.1.1. This fruitless search can be avoided with the present second preferred approach described herein in which the UE selects the stored old RPLMN, that is the RPLMN that was stored before the previous manual CSG selection. Having knowledge of the previous RPLMN and permission to use it can mean that only a short scan of only very few frequencies in a single and known RAT is required.

The previous, stored PLMN selection mode may be used as a criterion for other decisions by the UE. For example, if the user changes the current PLMN selection mode to manual PLMN selection mode when registered in the manually selected CSG, the UE may be required to follow the "Manual Network Selection Mode Procedure" as set out in 3GPP TS 23.122 sub clause 4.4.3.1.2.

As noted above, the Technical Specification 3GPP TS 23.122 of the 3rd Generation Partnership Project requires that if the user manually selects a CSG cell in a PLMN that is different from the RPLMN (the current registered PLMN), then the UE 1 must store duplicates of the PLMN selection mode (i.e. manual or automatic) and the last registered PLMN (RPLMN) prior to entering CSG cell selection. (The data for the last RPLMN may be the MCC+MNC (Mobile Country Code and Mobile Network Code) of the last registered PLMN.) It has been appreciated however that the Specification does not provide for any control over the lifetime of that stored data. This can be a particular problem in the case of the UE attempting to locate and select a new PLMN. Stored PLMN selection mode and stored RPLMN maintain the PLMN selection parameters for macro cell PLMN selection while in a CSG cell. This stored history information can be used to optimize the first macro cell PLMN selection after CSG has been selected manually. However, it has been appreciated that after that macro cell PLMN selection, the stored history information loses its value completely. Accordingly, in accordance with another embodiment of the present disclosure, when a UE has stored a duplicate value of a registered PLMN and stored PLMN selection mode, the UE invalidates (or, equivalently, deletes, nulls, etc.) the stored duplicate value of the registered PLMN and stored PLMN selection when performing PLMN selection, either in manual or automatic PLMN selection mode.

FIG. 3 shows schematically an example of a method of operating a user equipment. At 100, a wireless device, such as a UE, in a closed subscriber group CSG which was selected manually, receives an input from a user to initiate automatic PLMN selection in order to attempt to register with a PLMN. At 110, the wireless device selects the currently registered PLMN of the wireless device as the highest priority PLMN for the automatic PLMN selection. Alternatively or additionally, at 120 the wireless device restores the stored duplicate of registered PLMN as a registered PLMN of the wireless device and uses that registered PLMN as the highest priority PLMN for the automatic PLMN selection. Alternatively or additionally, at 130 the wireless device selects one of (i) the currently registered PLMN of the wireless device and (ii) a home or equivalent home PLMN of the wireless device for the automatic PLMN selection. Alternatively or additionally, at 140 the wireless device records whether a previous PLMN selection mode was automatic or manual; and in the case that the previous PLMN selection mode was manual, the wireless device uses a previously stored registered PLMN as the highest priority PLMN for the automatic PLMN selection.

FIG. 4 shows schematically an example of another method of operating a user equipment. At 200, a wireless device, such as a UE, in a closed subscriber group CSG, stores a duplicate value of a registered PLMN and stored PLMN selection mode. At 210, the wireless device invalidates/deletes/nulls the stored duplicate value of registered PLMN and stored PLMN selection mode when the wireless device has further entered into either a manual or an automatic PLMN selection mode.

Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

It will be understood that the processor or processing system or circuitry referred to herein may in practice be provided by a single chip or integrated circuit or plural chips or integrated circuits, optionally provided as a chipset, an application-specific integrated circuit (ASIC), field-programmable gate array (FPGA), digital signal processor (DSP), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of a wireless device attempting to register with a public land mobile network (PLMN), the method comprising:

receiving an input at a wireless device that is in a closed subscriber group (CSG) which was selected manually, the input being to initiate automatic PLMN selection in order to attempt to register with a PLMN; and using, by the wireless device, one of a plurality of predetermined PLMNs during the automatic PLMN selection initiated by the user, the plurality of predetermined PLMNs being at a same priority level, wherein the plurality of PLMNs include a currently registered PLMN and a home or equivalent PLMN, each being selected to have a same priority for the automatic PLMN selection, and the method further includes selecting, by the wireless device and from the predetermined PLMNs, one of (i) a currently registered PLMN of the wireless device and (ii) a home or equivalent home PLMN of the wireless device for the automatic PLMN selection.

2. The method of claim 1, comprising:

restoring, by the wireless device, a stored duplicate of a registered PLMN of the predetermined PLMNs as a registered PLMN of the wireless device; and using, by the wireless device, the registered PLMN as a PLMN for the automatic PLMN selection.

3. The method of claim 1, wherein the currently registered PLMN and the home or equivalent PLMN are set to a priority that is higher than priorities of other PLMNs for the automatic PLMN selection.

4. The method of claim 1, wherein selection of one of the predetermined PLMNs is based, at least in part, on history information.

5. The method of claim 1, comprising:

recording, at the wireless device, whether a previous PLMN selection mode was automatic or manual; and in the case that the previous PLMN selection mode was manual, using, by the wireless device, a previously stored registered PLMN as a PLMN for the automatic PLMN selection.

6. The method of claim 5, comprising:

using, by the wireless device, a home or equivalent home PLMN of the wireless device from the plurality of PLMNs for the automatic PLMN selection in the case that the previous PLMN selection mode was automatic.

7. An apparatus to cause a wireless device to attempt to register with a public land mobile network (PLMN), the apparatus comprising:

circuitry configured to cause the wireless device to receive an input to initiate automatic PLMN selection in order to attempt to register with a PLMN, the wireless device being in a closed subscriber group (CSG) that was manually selected; and cause the wireless device to use one of a plurality of predetermined PLMNs during the automatic PLMN selection initiated by the user, the plurality of PLMNs being at a same priority level, wherein the plurality of predetermined PLMNs include a currently registered PLMN and a home or equivalent PLMN, each being selected to have a same priority for the automatic PLMN selection, and the circuitry is further configured to cause the wireless device to select from the plurality of predetermined PLMNs one of (i) a currently registered PLMN of the wireless device and (ii) a home or equivalent home PLMN of the wireless device for the automatic PLMN selection.

8. The apparatus of claim 7, wherein the circuitry is further configured to cause the wireless device to restore a stored duplicate of a registered PLMN of the predetermined PLMNs as a registered PLMN of the wireless device, and to use the registered PLMN as a PLMN for the automatic PLMN selection.

9. The apparatus of claim 7, wherein the currently registered PLMN and the home or equivalent PLMN are set to a priority that is higher than a priority of other PLMNs for the automatic PLMN selection.

10. The apparatus of claim 7, wherein the circuitry is further configured to cause the wireless device to record whether a previous PLMN selection mode was automatic or manual; and in the case that the previous PLMN selection mode was manual, to cause the wireless device to use a previously stored registered PLMN as a for the automatic PLMN selection.

11. The apparatus of claim 10, wherein the circuitry is further configured to cause the wireless device to use a home or equivalent home PLMN of the wireless device for the automatic PLMN selection in the case that the previous PLMN selection mode was automatic.

* * * * *